(12) United States Patent
Andrag et al.

(10) Patent No.: US 10,426,105 B2
(45) Date of Patent: Oct. 1, 2019

(54) TRAVELLING IRRIGATION WHEELED SUPPORT TOWER

(71) Applicant: AGRICO (PTY) LTD, Bellville (ZA)

(72) Inventors: Roland Andrag, Stellenbosch (ZA); Rodger De Canha, Brackenfell (ZA); Johan Lund, Beaufort West (ZA); Jurie Martin Bekker, Lichtenburg (ZA)

(73) Assignee: AGRICO (PTY) LTD, Bellville (ZA)

( * ) Notice: Subject to any disclaimer, the term of this patent is extended or adjusted under 35 U.S.C. 154(b) by 0 days.

(21) Appl. No.: 15/779,921

(22) PCT Filed: Nov. 14, 2016

(86) PCT No.: PCT/IB2016/056835
§ 371 (c)(1),
(2) Date: May 30, 2018

(87) PCT Pub. No.: WO2017/098352
PCT Pub. Date: Jun. 15, 2017

(65) Prior Publication Data
US 2018/0325047 A1    Nov. 15, 2018

(30) Foreign Application Priority Data
Dec. 8, 2015 (ZA) .................................. 2015/08931

(51) Int. Cl.
*A01G 25/09* (2006.01)

(52) U.S. Cl.
CPC ........... *A01G 25/09* (2013.01); *A01G 25/092* (2013.01)

(58) Field of Classification Search
CPC ............................... A01G 25/09; A01G 25/092
(Continued)

(56) References Cited

U.S. PATENT DOCUMENTS

| 3,771,719 | A |   | 11/1973 | Raso et al. |            |
|-----------|---|---|---------|-------------|------------|
| 3,926,372 | A | * | 12/1975 | Johnson     | A01G 25/092 |
|           |   |   |         |             | 239/726    |

(Continued)

OTHER PUBLICATIONS

International Search Report and Written Opinion dated May 16, 2017 by the International Searching Authority for Patent Application No. PCT/IB2016/056835, which was filed on Nov. 14, 2016 and published as WO 2017/098352 (Inventor—Andrag et al.; Applicant—Agrico (PTY) Ltd.) (5 pages).

*Primary Examiner* — Darren W Gorman
(74) *Attorney, Agent, or Firm* — Ballard Spahr LLP

(57) ABSTRACT

A wheeled support tower for a travelling irrigation machine is provided. A tower frame includes at least two legs and a base beam interconnecting lower ends thereof and at least two wheels located towards two extremities of the base beam. The base beam that houses at least two drive shafts therein, and preferably the legs, are of a tubular construction. One or more center drives for rotating the drive shafts are also located within a housing forming part the base beam. The two legs and base beam may be arranged to form a generally triangular support tower. The drive shafts may be coupled to wheel boxes each of which houses a driving gear arrangement for an associated wheel hub. The wheel boxes are in a lower vertical position than the lower ends of the legs and fall at least partially within the width of the legs in plan view in the normal operative position thereof.

16 Claims, 3 Drawing Sheets

(58) Field of Classification Search
USPC ........ 239/728–731, 735, 737; 180/65.6, 342, 180/343
See application file for complete search history.

(56) References Cited

U.S. PATENT DOCUMENTS

| | | | | |
|---|---|---|---|---|
| 4,068,679 A | * | 1/1978 | Pringle | ................ A01G 25/092 239/728 |
| 4,133,344 A | | 1/1979 | Hunter et al. | |
| 4,618,102 A | * | 10/1986 | Meis | .................... A01G 25/092 180/65.6 |
| 5,685,497 A | | 11/1997 | Cole | |
| 5,862,997 A | | 1/1999 | Reinke | |

* cited by examiner

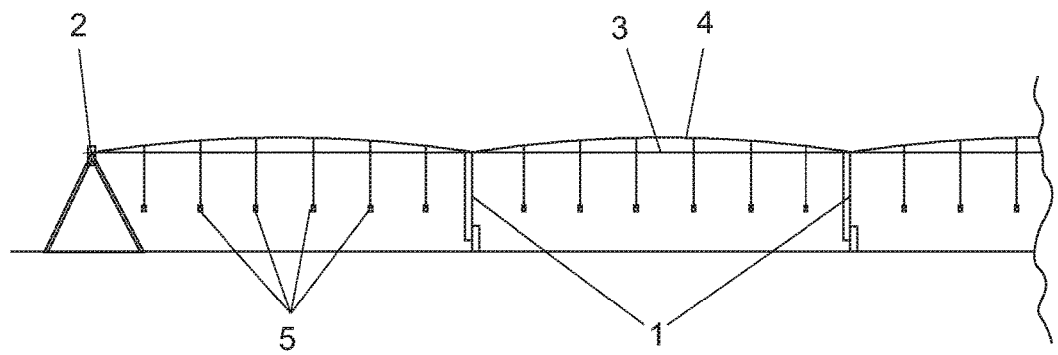
Figure 1
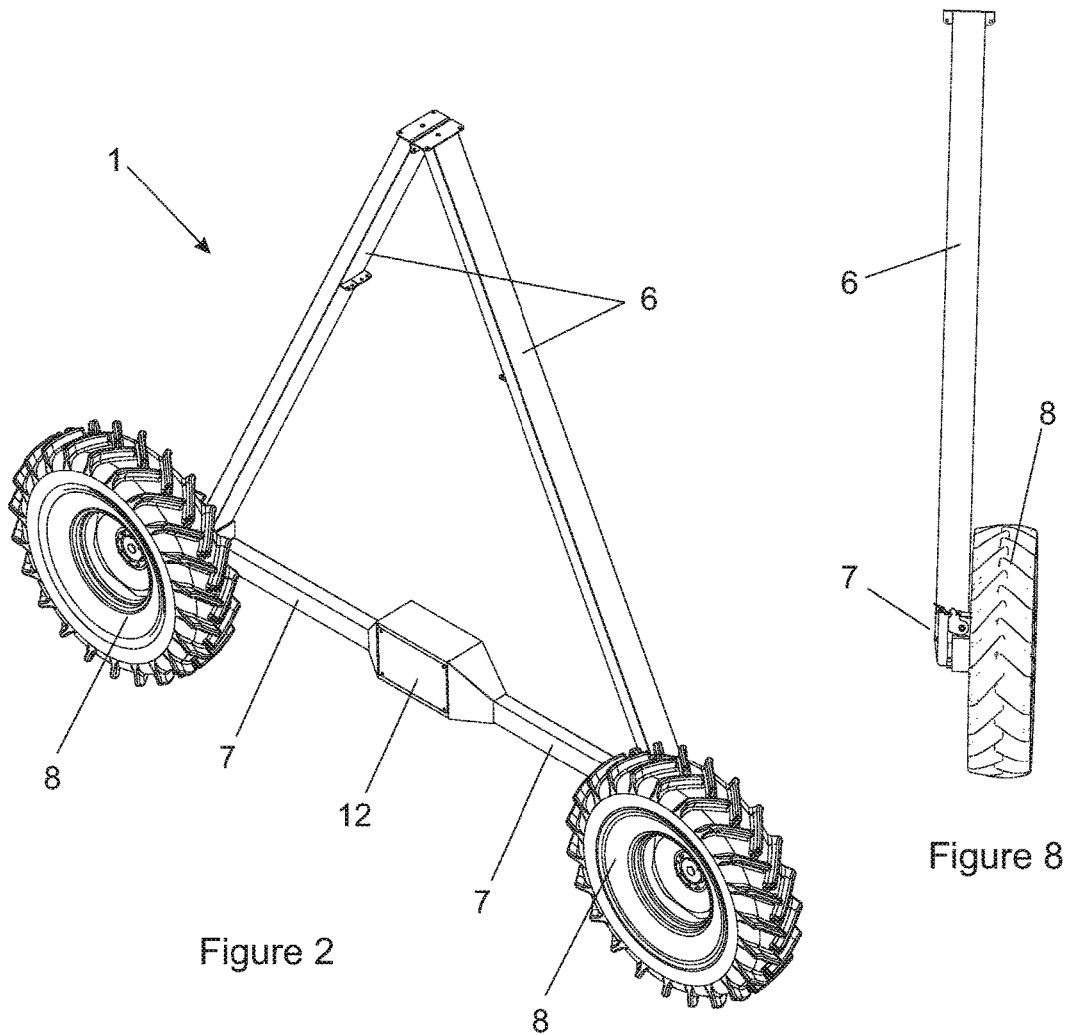
Figure 2
Figure 8

TRAVELLING IRRIGATION WHEELED SUPPORT TOWER

CROSS-REFERENCE TO RELATED APPLICATION

This application is a U.S. National Phase Application of International Application No. PCT/IB2016/056835, filed Nov. 14, 2016, which claims priority from South African complete patent application number 2015/08931 filed on 8 Dec. 2015, which are both incorporated by reference herein in their entirety.

FIELD OF THE INVENTION

This invention relates to a travelling irrigation wheeled support tower of the type that is employed for supporting water supply pipes extending between spaced travelling support towers in an irrigation machine. The irrigation machine may be of the centre pivot type in which the travelling irrigation machine moves in a circle around a centre pivot, or of the linear travel type in which the irrigation machine travels along paths that are not physically restricted to movement relative to a single reference point.

More particularly, the invention relates to a support tower in which the tower has wheels that are driven in order to cause the support tower to move relative to the ground. The centre pivot type of irrigation machine moves in a path around a centre pivot in a field, whilst the linear travel type runs up and down linearly or in a more sophisticated path of movement such as an oval, often referred to as a racecourse, or the like.

Spans supporting a water supply pipe and water sprinklers extend between adjacent irrigation support towers with the spans typically embodying some form of bowstring or other truss construction for sections of the supply pipe.

BACKGROUND TO THE INVENTION

Support towers generally consist of legs or leg assemblies and a drive tube or a base beam typically arranged in a generally triangular configuration with a driven wheel at or towards each of the two lower corners of the frame or towards the ends of the base beam. A driving motor assembly that is typically called a centre drive is commonly mounted near the centre of the base beam and includes a motor and a reduction gearbox. The centre drive connects to the two wheel boxes that may each include a drive worm via rotatable drive shafts and couplings. The drive shafts and couplings are covered for safety and longevity using suitable covers and a wheel assembly is connected to a hub of each wheel box.

In one common arrangement of this nature the centre drive, drive shafts and couplings are all located on one side of the base beam and the wheel boxes that are driven by the drive shafts are located between the base beam and the wheels. The arrangement therefore provides a leg and wheel assembly having a significant width in the direction of movement of the support tower and that width impacts on, and possibly damages, the crop being irrigated. The arrangement may also act to widen the wheel track which may contribute to or exacerbate rutting resulting from water run-off.

The wheel box may not be attached directly to the base beam but rather to a swivel bracket that is in turn attached to the base beam. On the one hand this may allow the wheel to be swung through 90 degrees so that the machine is therefore towable in the direction of the water supply pipe from one centre pivot circle to another. On the other hand, a wheel mounted to a swivel bracket can easily be set at a slight angle to effect a toe-in adjustment so that the wheel tracks properly in a circular wheel track in the case of a centre pivot arrangement.

The centre drive is, in any event, exposed to all the elements in addition to water from the irrigator. Plant material may penetrate to the inside of drive shaft covers and could damage oil seals on the centre drive and/or wheel boxes.

In existing arrangements many of the components are exposed and therefore susceptible to theft or vandalism.

There is scope for improvement of the situation.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with this invention there is provided a wheeled support tower for a travelling irrigation machine comprising a frame including at least two legs and a base beam interconnecting lower ends of the two legs, with at least two wheel hubs provided along the base beam of which two are located at or towards two extremities of the base beam, wherein the base beam is made as a tubular construction that houses at least two drive shafts within the tubular construction and one or more centre drives for rotating the drive shafts, and wherein the or each centre drive is located within a housing carried by, or forming part of, the base beam.

Further features of the invention provide for the two legs and base beam to be arranged to form a generally triangular support tower; for the drive shafts to be coupled to wheel boxes each of which houses a driving gear arrangement for a wheel hub; for the wheel boxes to be in a lower vertical position than lower ends of the legs and to fall partially or fully within the width of the legs in plan view in the normal operative position thereof; for the wheel boxes to each be carried on a swivel bracket; and for the legs to be of tubular construction with an electrical supply cable for the centre drive passing through one of the tubular leg members and through an adjacent part of the tubular base beam. The cable may be fixed at intermittent points along the leg through which the cable passes. The housing may form part of the base beam with the base beam and housing made as a single weldment.

The centre drive can be of any suitable type but will typically be a conventional electric motor driving a suitable reduction gear having two oppositely directed outputs to which suitable couplings are attached in order to drive the two drive shafts.

The wheel boxes may also be of any suitable type and may conveniently be of a type embodying a reduction gear assembly including a driving worm and a driven worm gear to transfer rotational movement to a wheel hub.

In order that the invention may be more fully understood one embodiment thereof will now be described with reference to the accompanying drawings.

BRIEF DESCRIPTION OF THE DRAWINGS

In the drawings:

FIG. 1 is a schematic representation of a centre pivot irrigation machine of the type to which the current invention may be applied;

FIG. 2 is an isometric view of one of one embodiment of a wheeled support tower according to the invention;

FIG. 8 is a front elevation of the wheeled support tower.

DETAILED DESCRIPTION WITH REFERENCE TO THE DRAWINGS

Figure 3:
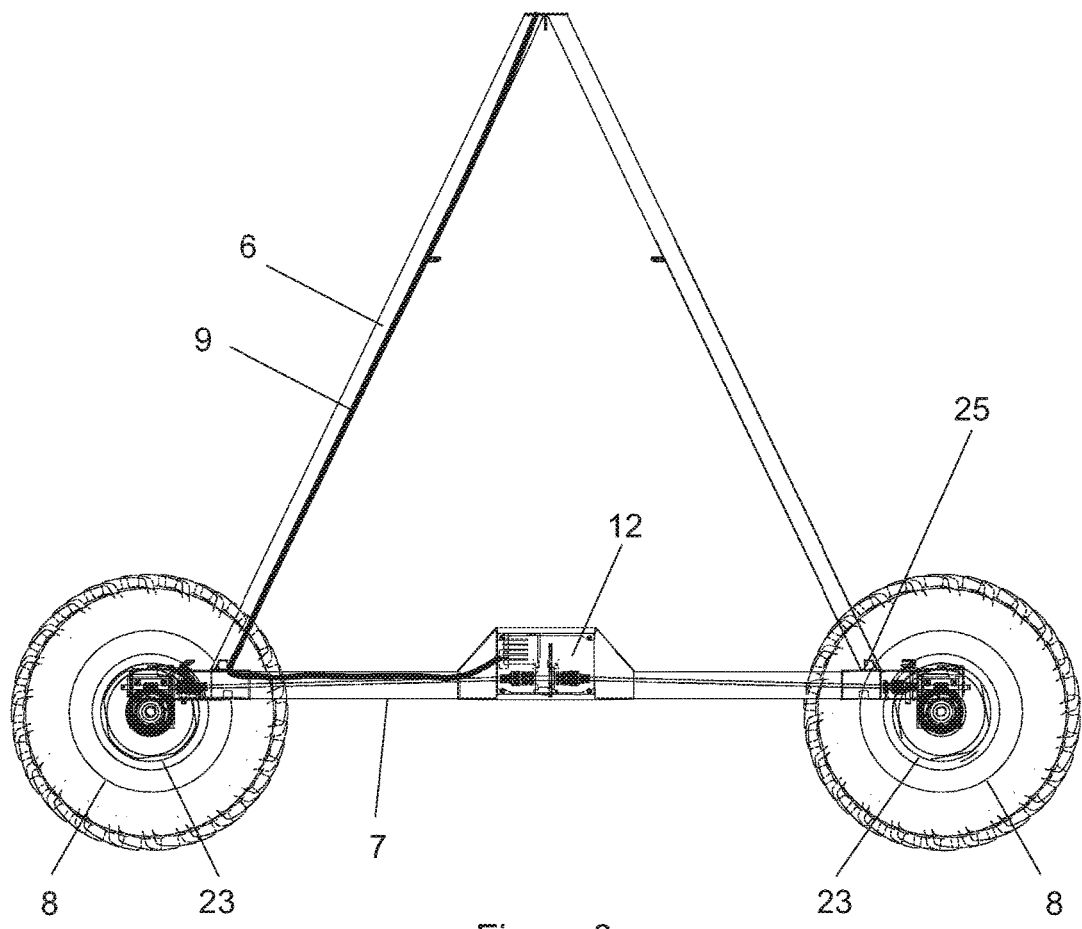
FIG. 3 is a schematic partially sectioned elevation of the wheel support tower illustrated in FIG. 2 showing the internal components of the wheeled support tower.
Figure 4:
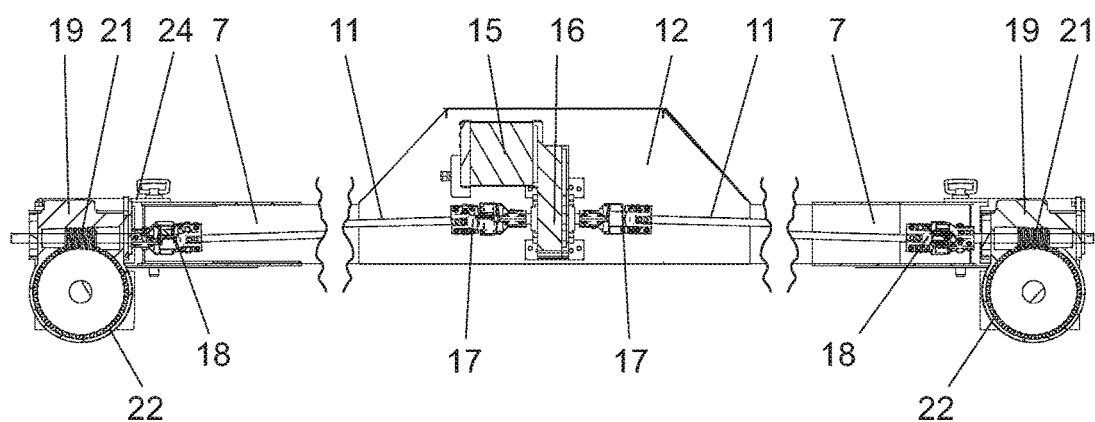
FIG. 4 is an enlarged schematic sectional elevation of the central portion and end portions of the base beam alone with the wheels removed.

In the embodiment of the invention illustrated in the drawings, a wheeled support tower (1) is made for inclusion in a travelling irrigation machine, in this instance of a centre pivot type, as illustrated in FIG. 1. The irrigation machine in this instance moves, in use, in a circular path around a centre pivot (2) in a field, with spans (3) of a water supply pipe (4) and drop water sprinklers (5) extending between adjacent irrigation support towers. The spans typically embody some form of bowstring or other truss construction for the unsupported sections of the supply pipe between adjacent wheeled support towers.

Of course, exactly the same principles as are described below can be applied to a wheeled support tower in a linear travel type of irrigation machine that runs up and down linearly or, in a more sophisticated path of movement such as an oval, often referred to as a racecourse, as will be quite apparent from what follows to those skilled in the art.

Each of the wheeled support towers comprises a frame including at least two legs (6) and a base beam (7) interconnecting the lower ends of the two legs, with two wheels (8) being located at or towards two extremities of the base beam. The base beam is made as a tubular construction that houses two oppositely directed drive shafts (11) within the tubular construction and a centre drive for rotating the drive shafts.

The centre drive is located within a central housing (12) forming an enlarged central part of the base beam. The central housing (12) is dimensioned to accommodate the central drive in an upright orientation selected so as to conserve the width of the housing which on its side remote from the wheels is flush with the outer surface of the two sections of base beam (7) that extend from it. The increased width of the central housing that is necessary to accommodate the increased width of the centre drive extends inwards between the two wheels, as indicated by numeral (13) (see FIG. 5), so that the overall tracking width of the wheeled support tower may be minimised as will become more apparent from what follows. The central housing (12) may also house electrical components for controlling the centre drive such as a contactor or variable speed drive. An emergency stop button may be provided on an exterior of the central housing (12) so that operation of the tower can be stopped in an emergency.

The entire assembly of base beam and central housing is, in this instance, made as a weldment. The dimensions of the two sections of base beam (7) are, in this instance, 100 mm wide by 150 mm high. This construction enables, for example, a conventional 165 mm drive tube plus a 20 mm wide laterally extending bracket onto which the centre drive bolts to be obviated because the present arrangement requires only a 4 mm wall to the central housing to support the centre drive. The effect of this can be used to reduce the wheel track width by about 100 to 160 mm as compared to the prior art irrigation machines, thereby reducing a crop interference width of the tower.

The two legs and the base beam are arranged to form a generally triangular support tower and each of the legs is made as a weldment with a rectangular tubular configuration having, in this embodiment, a width of 200 mm and a height of 100 mm so as to be capable of merging with the width of the base beam (7) towards its two opposite ends. The ends of the legs are secured to the top of the base beam toward its extremities so as to be generally coplanar and form a triangular frame. This means that the leg actually bolts onto the base beam above the drive shaft, and not to the side of it as in the case of current designs that are known to applicant. The tubular legs and tubular base beam enable an electric cable (9) (see FIG. 3) connected to the centre drive located inside the central housing of the base beam to be housed in the one leg and one part of the base beam so that it is not accessible for ease of theft or susceptible to damage by wind, weather, water, people, crop or livestock. It is further anticipated that the cable (9) may be fixed at intermittent points along the leg in which the cable is located to further frustrate unauthorised efforts to remove it.

The centre drive can be of any suitable type but will typically be a conventional electric induction motor (15) driving a suitable reduction gear (16) having two oppositely directed outputs to which couplings (17) are attached in order to drive the two oppositely directed drive shafts (11). Each of the opposite ends of the drive shafts is connected by way of couplings (18) to wheel boxes (19).

Each wheel box houses a driving arrangement that in this instance has a reduction gear assembly including a driving worm (21) and a driven worm gear (22) that transfer rotational movement to a wheel hub (23) that has its axis of rotation at approximately right angles to the axis of rotation of the drive shafts in the normal operative position of the hub and wheel carried by it. The wheel boxes are located on a vertical level below the lower ends of the legs so that they fall partially or fully within the width of the legs in plan view in the normal operative position thereof, as will be apparent from a reference to FIG. 7.

In this embodiment of the invention the wheel boxes are each carried on a swivel bracket (24), set at a slight angle to effect a toe-in adjustment so that the wheel tracks properly in a circular wheel track in the case of a centre pivot arrangement. The swivel bracket enables the wheels to be rotated through 90° to enable the irrigation machine to be towed from one centre pivot position to another with the wheels at right angles to their normal operative orientations. Consequent on the location of the drive shafts within the base beam, the swivel bracket only needs to project by about 60 mm behind the wheel box in plan view as may be compared to distances of the order of 180 mm or so for most current designs. The swivel bracket (24) has its pivot point arranged in close proximity to the coupling (18) so as to allow easy decoupling of the coupling without the need for the drive shaft to be moved.

Figure 5:
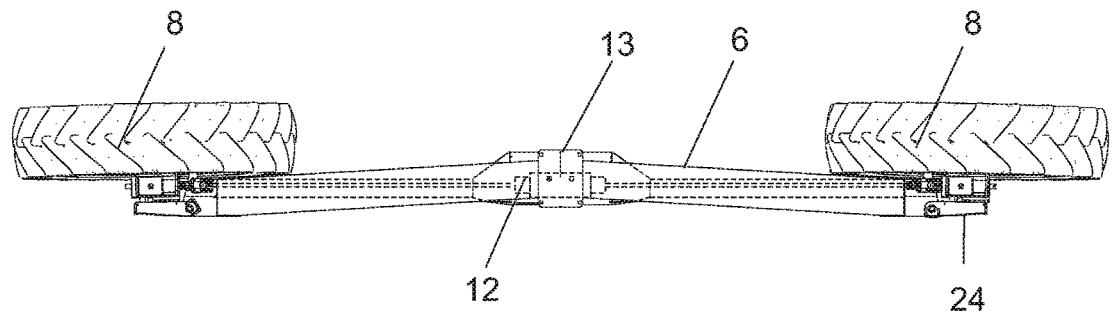
FIG. 5 is a plan view of the wheeled support tower.
Figure 6:
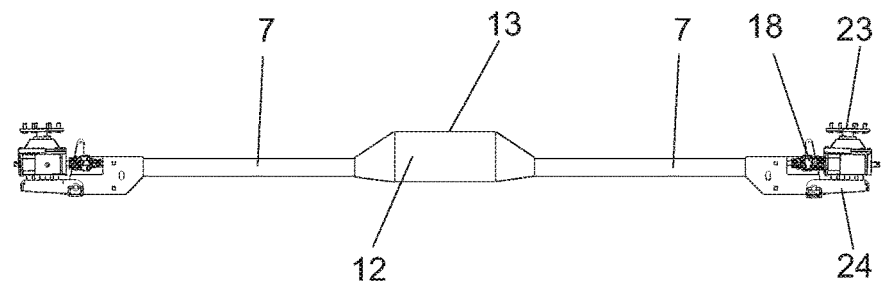
FIG. 6 is a plan view of the base beam alone with the wheels removed.
Figure 7:
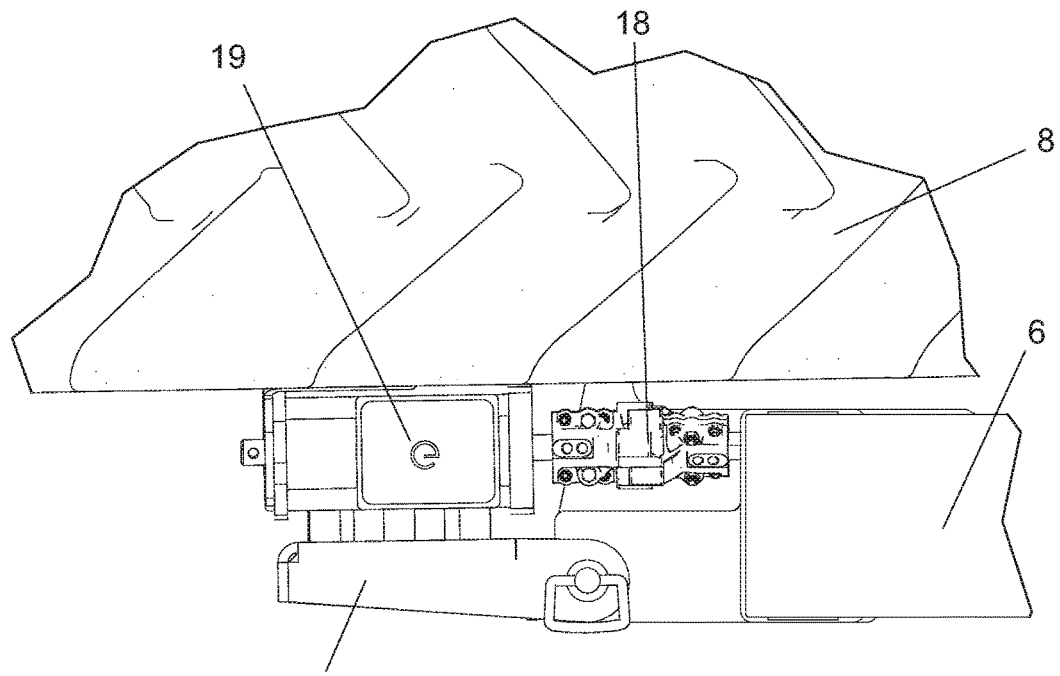
FIG. 7 is an enlarged plan view of one end of the base beam showing the mounting of the wheel box to the end of the base beam.

Referring particularly to FIGS. 5 and 7, the base beam, when viewed from the top, has been moved towards the outside of a circle of travel of the irrigation machine as much as is considered to be practical. There is thus provided a minimum clearance between a tyre and the base beam that may for example be about 25 mm when a wheel has been fitted with the largest tyres that the machine is designed to accommodate.

Using the construction of legs and base beam described above, a hole (25) (see FIG. 3) may be provided at the bottom of the leg assembly to act as a jacking point for a high lift jack as in the case of other prior art machines that have this feature.

Of course, any closures to access apertures of any housings or other boxes can be secured using tamper proof fasteners, padlocks or other suitable locking mechanisms.

Numerous variations may be made to the embodiment of the invention described above without departing from the scope of the invention. In particular, the single tubular construction of the legs could be varied although it is preferred that at least one frame member of each leg construction be tubular in order to accommodate an electric cable as described above. Also, the commonly used electric motor drive could be replaced by a hydraulic motor without adversely affecting the effectiveness of the invention.

Similarly, as may be required, the swivel brackets could be omitted entirely or replaced by any other suitable mounting arrangement. It should be appreciated that in other embodiments of the invention, a wheeled support tower may have more than two wheels along the base beam. For example, a wheeled support tower having four driven wheels may be provided, which may be appropriate for support towers where a long and consequently heavy supply line must be dragged by the tower. In such an arrangement, the wheels may be in-line with two of the wheels located at or towards two extremities of the base beam and the remaining two wheels located intermediately. Each of the four wheels would then have an associated wheel hub connected to a drive shaft.

In another embodiment, a wheeled support tower having more than one centre drive may be provided. For example, the wheeled support tower may have two centre drives and two or more wheels. For example, a wheeled tower support tower having four wheels and three centre drives is provided.

Finally, as already indicated above, the invention is not limited in any way by the overall direction of travel of the irrigation machine and the invention could equally well be applied to linear travel machines, for example.

Throughout the specification and claims unless the content requires otherwise the word 'comprise' or variations such as 'comprises' or 'comprising' will be understood to imply the inclusion of a stated integer or group of integers but not the exclusion of any other integer or group of integers.

The invention claimed is:

1. A wheeled support tower for a travelling irrigation machine comprising a frame including at least two legs and a base beam interconnecting lower ends of the at least two legs, with at least two wheel hubs provided along the base beam of which two are located at or towards two extremities of the base beam, wherein the base beam is made as a tubular construction that houses at least two drive shafts within the tubular construction and one or more centre drives for rotating the drive shafts, and wherein the or each centre drive is located within a housing that forms an enlarged part of the base beam.

2. A wheeled support tower as claimed in claim 1 in which the at least two legs and the base beam are arranged to form a generally triangular support tower.

3. A wheeled support tower as claimed in claim 1 in which the drive shafts are coupled to wheel boxes each of which houses a driving gear arrangement for an associated one of the wheel hubs.

4. A wheeled support tower as claimed in claim 3 in which the wheel boxes are in a lower vertical position than the lower ends of the legs and fall within the width of the lower ends of the legs in plan view in the normal operative position thereof.

5. A wheeled support tower as claimed in claim 3 in which the wheel boxes are each carried on a swivel bracket supported by the associated base beam.

6. A wheeled support tower as claimed in claim 1 in which the legs are of tubular construction with an electrical supply cable for the or each centre drive passing through one of the tubular legs and through an adjacent part of the tubular base beam.

7. A wheeled support tower as claimed in claim 6 in which the cable is fixed at intermittent points along the leg through which the cable passes.

8. A wheeled support tower as claimed in claim 1 in which the or each centre drive includes an electric motor driving a reduction gear having two oppositely directed outputs to which couplings are attached in order to drive the at least two drive shafts.

9. A wheeled support tower as claimed in claim 3 in which each wheel box includes a reduction gear assembly including a driving worm and a driven worm gear to transfer rotational movement to an associated one of the wheel hubs, wherein the driven worm gear is rigidly fixed to the associated one of the wheel hubs.

10. A wheeled support tower as claimed in claim 1 in which the tubular construction of the base beam is a single weldment.

11. A wheeled support tower as claimed in claim 1 in which the enlarged part of the base beam that forms the housing is co-axial with the rest of the tubular construction of the base beam.

12. A wheeled support tower as claimed in claim 1 in which the tubular construction of the base beam includes one centre drive located within the housing, the housing forming an enlarged central part of the base beam.

13. A wheeled support tower as claimed in claim 12 in which the base beam includes two tubular sections that extend in opposite directions from the housing, each of the tubular sections housing one of the drive shafts, wherein the drive shafts are oppositely directed.

14. A wheeled support tower as claimed in claim 8 in which the electric motor and reduction gear are mounted one above the other in a vertical configuration so as to conserve a horizontal width of the housing.

15. A wheeled support tower as claimed in claim 1 in which the housing has a width in a horizontal direction that is enlarged relative to the rest of the base beam only towards a side of the base beam at which the wheel hubs are provided.

16. A wheeled support tower as claimed in claim 4 in which the legs are bolted onto the base beam above the drive shafts.

* * * * *